United States Patent Office 3,240,141
Patented Mar. 15, 1966

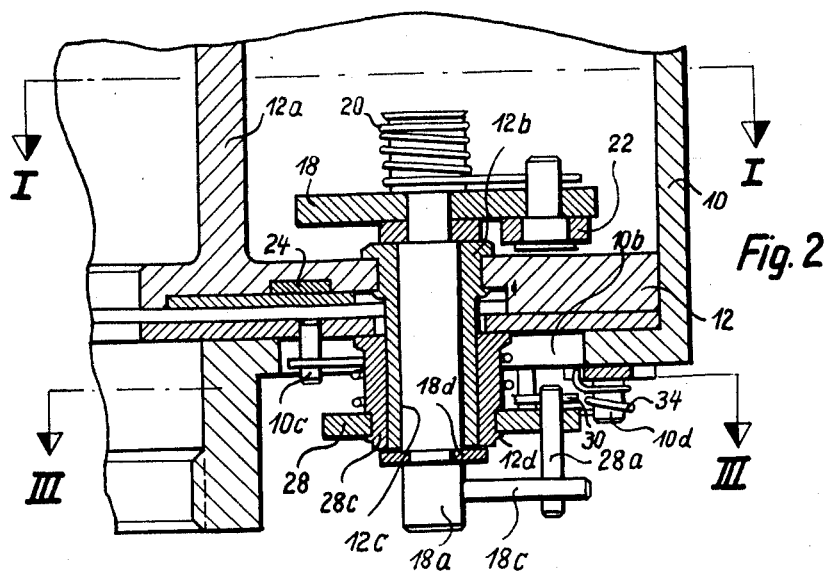
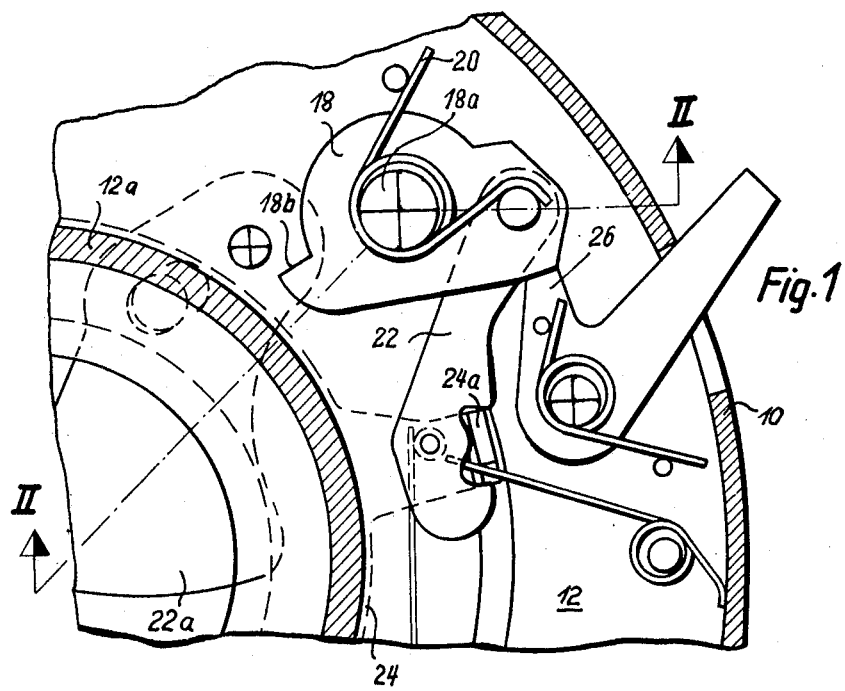

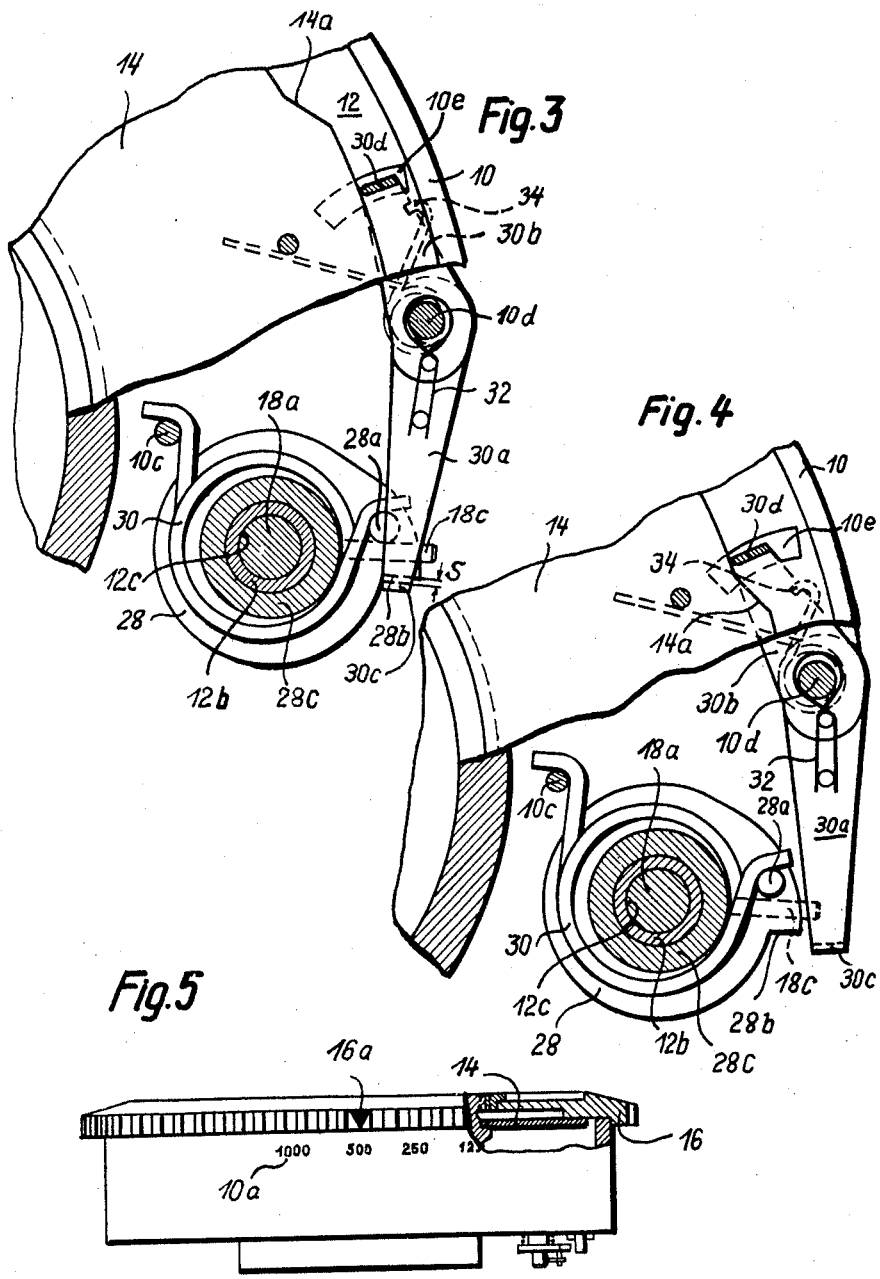

3,240,141
PHOTOGRAPHIC SHUTTER
Franz Singer and Helmut Müller, Munich, Germany, assignors to Compur-Werk Gesellschaft mit beschränkter Haftung & Co., Munich, Germany, a firm
Filed Aug. 21, 1963, Ser. No. 303,636
6 Claims. (Cl. 95—63)

This invention relates to a photographic shutter with a main operating member which, for the purpose of operating the blades of the shutter, can be impelled selectively by a main operating spring or by this and a supplementary spring, so as to achieve very short exposure periods allied with a normal shutter timing.

It is an object of the present invention to prevent the forces produced by the supplementary spring from acting on the exposure period setting ring during the procedure for setting the exposure period. The aim is to avoid the situation that the exposure period setting can only be brought about by applying a powerful force, which is a great shortcoming, particularly in the case of setting mechanisms using automatic means.

This object is met, in accordance with the present invention, by the fact that a main locking means is provided which can be cut out by the trip means and which holds both the main spring and the supplementary spring in cocked condition and that a supplementary locking means, which can be cut out by a member for setting the exposure period and which cooperates with a movable bearing for the supplementary spring, is so arranged that, in the event that the supplementary spring is not used, and after the release of the main locking means and a small initial movement of the movable bearing of the supplementary spring, will only then come into locking engagement with the same.

In the case of miniature cameras, for example for pictures 18 x 24 mm. in size, the shutter must also be very small and compact. It is therefore, for dimensional reasons, often very difficult to install the supplementary operating mechanism within the shutter.

The invention also furnishes a helpful expedient in this connection because, in accordance with a further feature of the invention, the main operating member is firmly mounted on a part of the cocking spindle projecting into the interior of the shutter housing, and have an abutment pin for the movable arm of the main spring, which surrounds the inner end of the cocking spindle, whilst the supplementary spring surrounds the outer part of the cocking shaft and its movable abutment likewise is mounted for free movement at this part of the cocking spindle.

Further features of the invention are disclosed in the following description of one embodiment given with reference to the accompanying drawings. In these latter:

FIGURE 1 is part of a shutter seen as a sectioned plan view from the line 1—1 of FIGURE 2, with irrelevant parts omitted, FIGURE 2 is a longitudinal section on the line 2—2 of FIGURE 1, FIGURES 3 and 4 show the supplementary operating mechanism in two different working positions, both being sections on the line 3—3 of FIGURE 2, and FIGURE 5 is a side view on a similar scale of the shutter according to the invention, part being in section.

FIGURES 1 to 5 of the accompanying drawings show a shutter which basically is of normal construction and has a housing 10 with a base plate 12 with the front objective tube 12a inserted therein. An exposure period cam ring 14 is rotatably mounted on the objective tube 12a and has an indexing step 14a therein. The cam ring is coupled for rotary movement with an external exposure period setter 16. This setter 16 has a marking 16a which is adjustable relatively to a fixed exposure period scale 10a on the shutter housing. There is also shown a main operating member 18 and a crank 22 which is pivotally coupled therewith, this crank cooperating with the blade operating ring 24 through the downturned lugs 24a in known fashion for opening and closing the blades 22a of the shutter. The main operating member 18 is firmly seated on a cocking spindle 18a which projects rearwardly from the shutter housing and has a main driving spring 20 which seeks to turn the main operating member in the clockwise direction. The nose 18b of the main operating member 18 cooperates with a delay action mechanism in the manner set out in Singer et al. patent application, Serial No. 274,563, filed April 22, 1963. In the cocked position shown in FIGURE 1 the main operating member, together with a supplementary operating means which will be described in more detail later, are held locked by the trip lever 26.

In accordance with this invention, a supplementary operating means is provided on the cocking spindle, which projects out of the rear wall of the shutter housing and is parallel to the optical axis, and it is arranged that the movable bearing 28 of the supplementary spring 30 shall be located co-axial and behind the main driving spring 20. A fixed bearing bush 12b is seated in the base plate 12, and the cocking spindle 18a is mounted in the axial bore 12c of this bush 12b. The movable bearing 28 is rigidly connected to a guide bush 28c, for example being riveted thereto at 12d. The bearing 28 and the guide bush 28c are mounted for free rotation externally on the bearing bush 12b and are held against axial movement by a spring ring 18d. The supplementary spring 30 has an immovable arm which bears against a fixed pin 10c which is disposed within the counter sink 10b, and its movable end engages around the pin 28a of the bearing 28. The supplementary spring 30 therefore strives to move the bearing 28 and guide bush 28c against the fixed bearing bush 12b in the clockwise direction. The rear end of the pin 28a cooperates with the driving pin 18c of the cocking spindle 18a when the supplementary operating means is connected up. In addition a locking lever, composed of two parts 30a and 30b, is mounted on the rear wall of the shutter housing for pivoting about a pin 10d. The lever parts 30a and 30b are coupled together by means of a hairpin spring 32. One lever arm 30a has a rearwardly projecting locking lug 30c which cooperates with a locking nose 28b of the movable bearing 28. The other lever arm 30b engages a control lug 30d through the slot 10e of the rear wall of the shutter housing and in the interior of the latter, and is pressed against the time cam ring 14, 14a by the spring 34.

The mechanism described operates as follows:

If the user wishes to take a photograph with a normal exposure period, for example 1/500 second, the exposure time setter 14, 14a has to be brought into the position shown in FIGURE 3 and the shutter cocked in the counterclockwise direction through the cocking spindle 18a. For this purpose the cocking spindle is, for example, coupled to the film feed means of the camera in known fashion. If the main drive means and supplementary drive means are in a completely unloaded condition before the beginning of the cocking motion, the driving pin 18c is applied against the pin 28a at the commencement of the loading of the main spring 20 and also moves the bearing 28 of the supplementary spring 30 into the cocked condition. In the course of this movement the lever arm 30a is swung radially outwards relatively to the movable lever arm 30b by the peripheral cam of the cam surface of the bearing 28 against the action of the hairpin spring 32. However, at the end of the cocking movement it assumes the position shown in FIGURE 3 because the lug 30c can again drop behind the locking nose 28b under the action of the hairpin spring 32. During this time the second lever arm 30b remains stationary and its control lug 30d, biased by the spring 34, bears against the time cam ring 14. At the end of the cocking movement the trip lever 26 is disposed in the rundown path of the main drive means 18, which has also been moved counterclockwise, and locks both the main drive and also the supplementary drive means. The arrangement is so devised, in accordance with a feature of the invention, that a slight play "s" is formed between the locking nose 28b and the locking lug 30c so as to prevent any strong frictional engagement being exerted between the surfaces 28b and 30c under the force of the supplementary spring in the cocked condition, such as would have to be overcome when the time cam ring 14 is adjusted. As a result the facility for adjustment of the time setter with a very small expenditure of effort, as required particularly in the case of automatic setting devices, would not however be ensured.

If now the trip 26 is operated in the clockwise direction, the main locking means for both the main and additional driving means is removed. Both drive means begin to move in the rundown direction under the action of springs 20 and 30. In the initial phase of this run-down movement the locking nose 28b of the bearing 28 is applied against the locking lug 30c, and is consequently prevented from further movement. The supplementary drive means is thus locked in its cocked position. As a consequence the driving pin 18c is released from pin 28a and the cocking shaft 18a moves only with the main drive means—and driven slowly by the spring 20—further into its rest position. During this movement of the main driving member, the blade operating ring 24 is reciprocated by the crank 22 on the downturned lug 24a to open and close the blades 22a of the shutter.

If, on the other hand, very fast moving subjects are to be photographed, the time cam ring 14 is turned from the position of FIGURE 3 into that of FIGURE 4 for the minimum exposure period, for example 1/1000 second. During this setting movement the control cam 14a of the time cam ring 14 arrives opposite the control lug 30d of the lever 30b and, under the action of spring 34, the locking levers 30a and 30b are turned as a unit in the counter-clockwise direction. As a consequence the engagement is broken between the locking lug 30c and the locking nose 28b. If, with the shutter cocked, the trip lever is pressed, the main locking device 26 is again released and the main driving means 18 and the supplementary driving means 28 move out of the cocked position under the action of their springs 20, 30. Since, in these setting circumstances, the locking means 30c, 28b is cut out, the additional driving means runs down the full distance with the main driving means so that as a consequence of the increased driving force exerted, there is a more rapid movement of the shutter blades and consequently an even shorter period of exposure.

The arrangement according to the invention affords the advantage that, with the shutter cocked and in the event that use is not made of the supplementary spring 30, a slight play "s" is included between the locking lug 30c of the lever arm 30a and the locking nose 28b of the movable bearing 28. This play prevents the loading of the supplementary spring 30 from manifesting itself as a frictional engagement affecting the movement of the two-part lever 30a, 30b and, as a consequence, the setter 14 as well, thereby assuring an easy action adjustability of the exposure period setting member. The requirement for a setting movement which involves a minimum expenditure of effort is thereby fulfilled and this driving system can also be used in the case of automatic regulating devices, for example in the case of shutters in which there is a programmed control of the exposure period and diaphragm.

A further advantage of the shutter according to the invention is to be observed in the fact that the supplementary spring 30 and bearing 28 are arranged coaxially behind the main driving means 18 and away from the rear wall of the shutter housing on the cocking spindle 18a. This affords a simple, compact structure and also a shutter construction which is economical in the use of parts and which, in spite of its very small dimensions, permits the use of a supplementary drive means to be used selectively in addition to the main drive means, again for reasons of space.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a photographic shutter, a shutter housing having a rear wall, a cocking spindle rotatably journalled in said housing and projecting through the rear wall thereof, a main operating member mounted on the forward end of said spindle, a main operating spring engaging said member and coaxial with said spindle, main locking means for said main operating member, a supplementary spring engageable with a pin on the rear end of said spindle, said supplementary spring being coaxial with the spindle, supplementary locking means adapted to lock the supplementary spring in a cocked position after release of said main operating member by said main locking means and an initial movement of the cocking spindle, an exposure setter, means on said supplementary locking means engageable with said exposure setter whereby movement of said exposure setter moves the supplementary locking means between operative and inoperative positions.

2. In a photographic shutter according to claim 1 wherein said supplementary spring is partially disposed in a depression in the rear wall of the shutter housing and said spring engages a fixed pin in said depression.

3. In a photographic shutter according to claim 1 wherein said supplementary locking means is mounted externally on the rear wall of the shutter housing.

4. In a photographic shutter comprising a shutter housing, a plurality of blades pivotal to open and close the shutter, a blade driving ring, operatively connected to said blades and rotatable to open and close the blades, a main operating member rotatably mounted in said housing, a crank interconnecting said main operating member and said blade driving ring whereby upon rotation of said main operating member said crank and blade driving ring are reciprocated to open and close the shutter, a main driving spring operatively connected to said main operating member, a trip lever pivotally mounted in said housing and adapted to retain said main operating member in a cocked position and movable to release said main operating member, a cocking spindle secured to said main operating member and rotatably mounting said member in the housing, a driving pin fixed to said cocking spindle, a movable bearing journalled on said cocking spindle, a pin secured to said bearing, a supplementary spring acting between said housing and said last named pin and in the energized position thereof urging said last named pin into engagement with said driving pin in a direction to rotate the main driving member to open and close the shutter, supplementary locking means, a locking nose on said movable bearing, a clearance between said locking nose and said supplementary locking means in the cocked position of said shutter and with said supplementary locking means in the operative position, a rotatable exposure setter ring, a cam on said exposure setter ring, said cam being engageable with said supplementary locking means to move said locking means between operative and inoperative positions, with said supplementary locking means in operative position release of said main operating member causing initial rotation of the blade driving ring by both said main and said supplementary springs until the supplementary locking means engages the locking nose and subsequent rotation of the blade driving ring being caused by said main driving spring only, with the supplementary locking means in inoperative position the entire rotation of said blade driving ring being caused by both the main and supplementary springs, the clearance between the locking nose and the supplementary locking means substantially reducing the force required to move said supplementary locking means between operative and inoperative positions.

5. In a photographic shutter according to claim 4 wherein said supplementary locking means included a pair of lever arms pivoted on a pivot pin, a hairpin spring interconnecting said lever arms, one said lever arms having a control lug engageable with the cam on said exposure setter ring, the other of said arms having a locking lug engageable with the locking nose on said movable bearing.

6. In a photographic shutter according to claim 5 and further including an additional spring to urge said control lug into engagement with the cam.

References Cited by the Examiner

UNITED STATES PATENTS 2,925,024  2/1960  Junghans _____ 95—63
3,014,418  12/1961  Hahn _____ 95—63

JOHN M. HORAN, *Primary Examiner.*